United States Patent [19]

Freund et al.

[11] Patent Number: 5,767,036

[45] Date of Patent: Jun. 16, 1998

[54] PLATINUM-ALUMINUM ALLOY CATALYST FOR FUEL CELLS AND METHOD OF ITS PRODUCTION AND USE

[75] Inventors: Andreas Freund, Kleinostheim; Thomas Lehmann, Langenselbold; Karl-Anton Starz, Rodenbach; Gerhard Heinz, Hasselroth; Robert Schwarz, Rodenbach, all of Germany

[73] Assignee: Degussa Aktiengesellschaft, Frankfurt am Main 1, Germany

[21] Appl. No.: 646,394

[22] Filed: May 8, 1996

Related U.S. Application Data

[60] Provisional application No. 60/007,711, Nov. 29, 1995.

[30] Foreign Application Priority Data

May 13, 1995 [DE] Germany ............... 195 17 598.0

[51] Int. Cl.[6] ............... B01J 21/18; B01J 23/00; B01J 23/56; B01J 23/42
[52] U.S. Cl. ............... 502/185; 502/313; 502/406; 502/323; 502/327; 502/332; 502/334
[58] Field of Search ............... 502/185, 184, 502/406, 313–327, 334, 335, 336, 337, 338

[56] References Cited

U.S. PATENT DOCUMENTS

| 3,309,231 | 3/1967 | Hess | 502/185 |
|---|---|---|---|
| 3,364,072 | 1/1968 | Barber | 502/313 |
| 3,762,957 | 10/1973 | Breault et al. | 136/121 |
| 3,840,471 | 10/1974 | Acres | 502/313 |
| 4,186,110 | 1/1980 | Jalan et al. | 252/425.3 |
| 4,192,907 | 3/1980 | Jalan et al. | 429/40 |
| 4,316,944 | 2/1982 | Landsman et al. | 502/101 |
| 4,794,054 | 12/1988 | Itoh et al. | 502/326 |
| 4,954,474 | 9/1990 | Tsurumi et al. | 502/326 |
| 5,013,618 | 5/1991 | Luczak | 502/326 |
| 5,024,905 | 6/1991 | Itoh et al. | 502/326 |
| 5,096,866 | 3/1992 | Itoh et al. | 502/184 |
| 5,189,005 | 2/1993 | Watanabe et al. | 502/326 |
| 5,489,563 | 2/1996 | Brand et al. | 502/313 |

FOREIGN PATENT DOCUMENTS

| 0 164 200 | 12/1985 | European Pat. Off. | C22C 1/00 |
|---|---|---|---|
| 0 329 626 | 8/1989 | European Pat. Off. | B01J 27/22 |
| 2926615 | 7/1989 | Germany . | |

Primary Examiner—Walter D. Griffin
Assistant Examiner—Patricia L. Hailey
Attorney, Agent, or Firm—Beveridge, DeGrandi, Weilacher & Young, LLP

[57] ABSTRACT

A catalyst for use in a fuel cell containing a platinum-aluminum alloy on a conductive carbon carrier, wherein the atomic ratio of platinum to aluminum is from 80:20 to 60:40 and the alloy is present on the carbon carrier in carbidized form with the structure of platinum-aluminum carbide $Pt_3AlC_{0.5}$. Also disclosed are multimetallic alloy catalysts for use as electrode catalysts in fuel cells. Catalysts with high activity and stability are obtained on the basis of carbidized platinum-aluminum alloy catalysts by adding alloying elements of the groups VIB, VIIB, VIII and IB of the Periodic Table of Elements.

6 Claims, 4 Drawing Sheets

5,767,036

1

PLATINUM-ALUMINUM ALLOY CATALYST FOR FUEL CELLS AND METHOD OF ITS PRODUCTION AND USE

REFERENCE TO A RELATED APPLICATION

This is a continuation of our copending U.S. Provisional Patent application Ser. No. 60/007,711 filed on Nov. 29, 1995 which is relied on and incorporated herein by reference in its entirety.

INTRODUCTION AND BACKGROUND

The present invention relates to a platinum-aluminum alloy catalyst and to a method of its production and its use in fuel cells.

Platinum catalysts and especially alloyed platinum catalysts on electrically conductive carbon carriers are used as electrode catalysts for anodes and/or cathodes in fuel cells, preferably in phosphoric-acid fuel cells (PAFC) and polymer electrolyte membrane fuel cells (PEMFC). Typical fuels used on the cathode side are oxygen and air and on the anode side hydrogen, hydrocarbons such as e.g. methane, oxygen-containing hydrocarbons such as e.g. alcohols or their reformates. The platinum charge is in a range of 7 to 60% by weight, preferably in a range of 10–35% by weight relative to the catalyst. Carbon blacks, graphitized blacks, graphite, carbides and their physical mixtures are used as electrically conductive carbon carriers as a function of the electrode type (anode or cathode).

It is known that the electrical output achieved from a phosphoric-acid fuel cell is essentially a function of the activity of the cathode catalyst. A higher current density at a given voltage as well as a lesser voltage drop during the service life of the fuel cell catalyst are therefore especially desirable. This reduces the costs per current unit generated.

Various methods of producing such alloy catalysts are described in the patent literature. The individual methods differ from each other essentially in the precursors used for the alloy components and by the manner of depositing the alloy components on the conductive carbon carrier. The manner of precipitation influences the fineness of the alloy particles deposited on the carbon carrier and, in turn, the catalytically active metal surface available for the electrochemical process.

After deposition on the carbon carrier of the alloy components, the latter can be reduced by wet chemistry or by a gaseous phase reduction.

All known methods terminate the production of the catalyst with a calcining heat treatment at a temperature between 200° and 1000° C. in an inert or reducing atmosphere, which concludes the reduction of the alloy components. When an inert atmosphere is used this concluding reduction reaction must be carried out at high temperatures whereas in a reducing atmosphere lower temperatures are sufficient.

During the cooling off to room temperature the alloy particles, which are initially present as an unordered alloy, are converted into a largely ordered alloy with primarily face-centered cubic or primarily cubically primitive space lattice structure, depending on the alloy composition (U.S. Pat. No. 4,677,092 which is incorporated by reference in its entirety). The platinum atoms on the one hand and the atoms of the other alloy components on the other hand assume defined lattice sites thereby. The resulting space lattice structure can be described as a superlattice structure of two space lattices which penetrate one another, the one of which is formed by the platinum atoms and the second by the other alloy components.

2

The ordered alloys are distinguished from prior materials by a higher ageing stability under the strongly corrosive conditions during operation in a phosphoric-acid (PA) fuel cell (operating temperature 170° to 200° C., 100% phosphoric acid as electrolyte).

The elements from groups IB, IVB, VB, VIB, VIIB, VIII and IIIA of the Periodic Table of Elements are known in the patent literature as suitable alloying elements for platinum. However, only certain particular alloy combinations were obtained in the particular practical examples of the prior developments. This includes e.g. the binary alloys Pt—(Cr, V, Mn, Mo, W) (U.S. Pat. No. 4,316,944 which is incorporated by reference in its entirety), Pt—Co (JP 4-118860), Pt—Ta (JP 3-236160), Pt—Fe (EP 0,129,399); the ternary alloys Pt—Co—Cr (U.S Pat. No. 4,677,092 which is incorporated by reference in its entirety), Pt—Ir—(Cr, Co, Fe) (U.S. Pat. No. 5,013,618 which is incorporated by reference in its entirety) and Pt—Fe—Co (U.S. Pat. No. 4,794,054 which is incorporated by reference in its entirety); as well as the quaternary alloy Pt—Fe—Co—Cu (EP 0,386,764 which corresponds to U.S. Pat. No. 5,024,905 which is incorporated by reference in its entirety).

Alloy catalysts using alloying elements from the group IIIA are mentioned in JP 3-127459, EP 0,450,849 (which corresponds to U.S. Pat. No. 5,024,905 which is incorporated by reference in its entirety) and U.S. Pat. No. 4,186,110 (which is incorporated by reference in its entirety).

However, only binary alloys Pt—V, Pt—Cr and Pt—Ni are realized in JP 3-127459. Amounts of these transition-metal elements which are high relative to the platinum are used which are partially or largely dissolved out again by a subsequent acid treatment. This acid treatment imparts an increased service life to the catalysts.

EP 0,450,849 describes the in situ production of platinum alloy catalysts with one or more elements of the groups IVB, VIB, VII, VII, IB and IIIA of the Periodic Table of Elements. Hexachloroplatinic acid is added to a basic suspension of the carrier material in water for the precipitation of platinum onto the carbon carrier. The alloy components are added as chlorides or nitrates to the suspension of the non-reduced Pt/C catalyst. The alloy formation is completed in the art as is customary by thermal treatment under an atmosphere of inert gas. A preceding wet-chemical reduction or gaseous phase reduction is optional.

In EP 0,450,849 alloy catalysts with elements from group IIIA of the Periodic Table of Elements are claimed, especially with gallium; however, corresponding examples of use are not described.

Examples with an alloy catalyst of a platinum-aluminum alloy are found only in U.S. Pat. No. 4,186,110. This patent describes the production of alloy catalysts of noble metal and a metal oxide. The alloy catalysts produced in this manner are said to exhibit an elevated activity compared to the pure platinum catalyst. W, Al, Ti, Si, Ce, Sr and combinations of the preceding elements are used as high-melting metals. These high-melting metals are preferably used in the form of fine oxides such as e.g. the pyrogenic oxides P-25 ($TiO_2$), Aerosil-380 ($SiO_2$), $Al_2O_3$—C and P-820 (aluminum silicate), all from the Degussa company. Example 3 of this patent gives no data for calculating the atomic ratio of Pt:Al and refers to example 2 wherein the atomic ratio of Pt:Ti can be calculated to be 45:55.

The platinum-aluminum catalysts described in U.S. Pat. No. 4,186,110 have not been successful in practice since with the development of ternary platinum-cobalt-chromium catalysts considerably more active catalysts with long-time stability were available. Also, the activity increase of 110% over the then available monometallic platinum catalysts reported therein can no longer be assumed in comparison to the optimized platinum catalysts available today.

SUMMARY OF THE INVENTION

One object of the present invention is to improve the ageing stability of catalysts with platinum-containing alloy compositions. It is a further a object of the present invention to achieve higher activity in catalysts with platinum-containing alloy compositions.

Platinum-aluminum alloy catalysts were surprisingly found which exhibit an improved ageing stability in comparison to the known platinum-aluminum catalysts and which can serve as the basis for the production of multimetallic alloy catalysts with excellent ageing stability and activity. It has been unexpectedly determined by applicants that these improvements are obtained with a platinum-aluminum catalyst wherein the atomic ratio of platinum to aluminum ranges from 80:20 to 60:40. According to the present invention, the alloy particles are present on the carbon carrier in carbidized form with the structure of platinum-aluminum carbide, represented by the formula $Pt_3AlC_{0.5}$.

Another object is to provide a method of producing such a catalyst by suspending a conductive carbon carrier in water to form a suspension, adding an aqueous solution of a platinum salt to the suspension, adding sufficient alkaline material to the suspension to raise the pH to 9 to precipitate the platinum onto the carrier, reducing the platinum with a reducing agent, adding an aqueous solution of an aluminum salt to the suspension, and adding an ammonia solution to the suspension to precipitate aluminum on the carrier.

Yet another object of the present invention is to provide a catalyst containing a platinum-aluminum alloy deposited on a conductive carbon carrier wherein the platinum-aluminum alloy is alloyed with at least one further alloy element L, to form a composition represented by the formula $$Pt_xAl_yL_z$$

in which L designates at least one alloy element selected from the group consisting of Groups VIB, VIIB, VIII and IB of the Periodic Table of Elements and mixtures thereof, and the atomic ratio of platinum to aluminum is from 85:15 to 60:40.

BRIEF DESCRIPTION OF DRAWING

The present invention will be further understood with reference to the accompanying drawings, wherein.

DETAILED DESCRIPTION OF INVENTION

Figure 1:
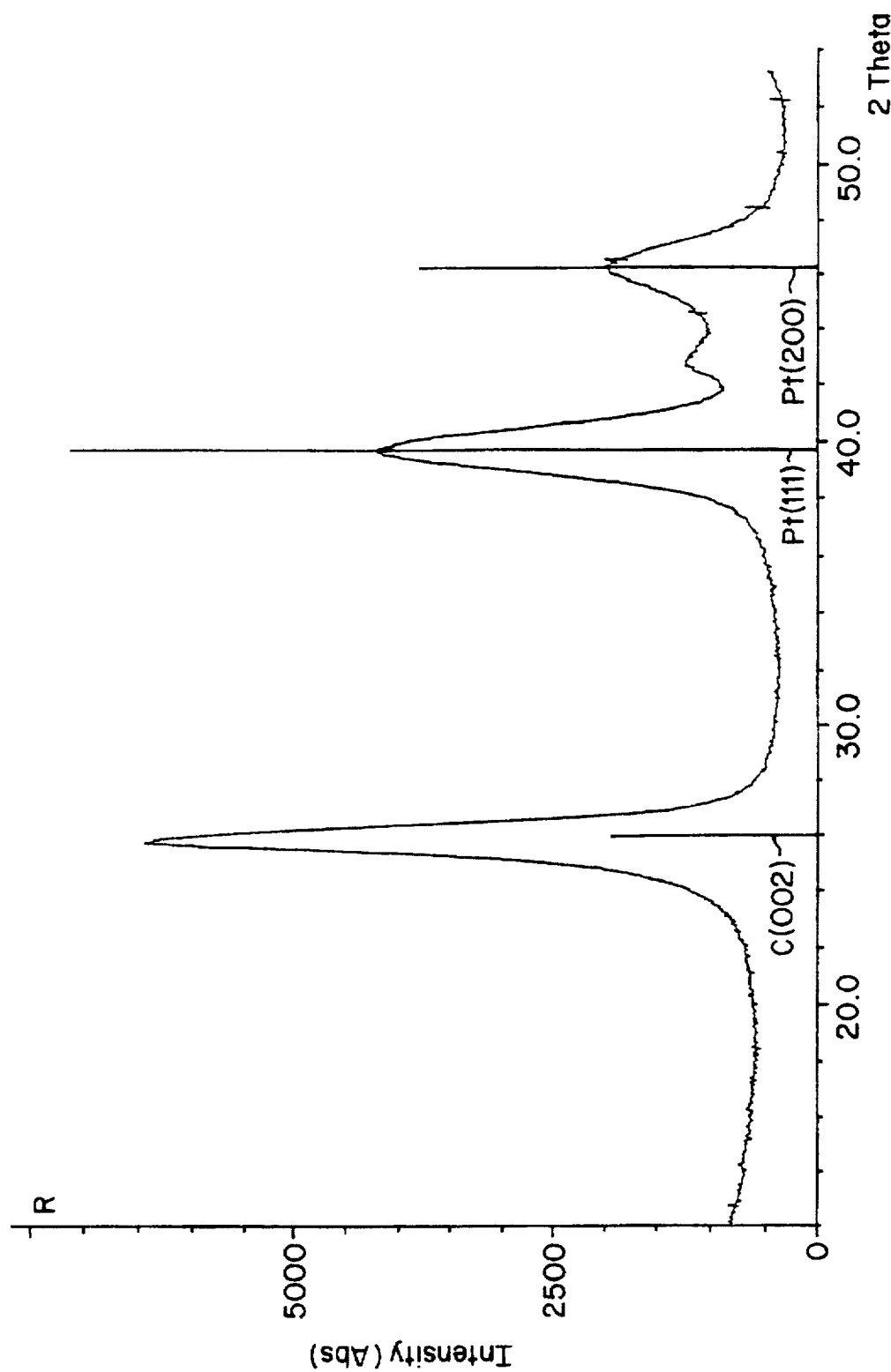
FIG. 1 shows an X-ray diffraction diagram of a monometallic reference catalyst.

According to a preferred embodiment of the invention, the platinum-aluminum catalysts of the invention are preferably produced by the sequential precipitation of platinum and aluminum onto the conductive carbon carrier. Water-soluble salts, preferably nitrate salts, are used as soluble precursors of the alloy components.

Platinum(IV) nitrate is preferably used as a precursor for the platinum main component of the alloy catalyst. Platinum (IV) nitrate is commercially obtainable and is usually produced from hexachloroplatinic acid. It thus still contains slight chlorine residues occasioned by the mode of production. Aside from these slight chlorine components the use of nitrate salts for all alloy components has the advantage that the resulting catalyst exhibits only a slight chlorine content.

In order to produce the platinum-aluminum catalyst of the invention, the conductive carbon carrier, e.g. graphitized carbon black (Vulcan XC-72 made by Cabot Corp.; see column 5, line 2 of U.S. Pat. No. 4,186,110 which is incorporated by reference in its entirety), is suspended in water and then heated to a temperature in the range between 70° and 100° C. (70°–100° C.), preferably between 80° and 90° C. (80°–90° C.). An aqueous solution of a water soluble compound (e.g., salt) of the alloy component (i.e., platinum) is then added. For the complete precipitation of the platinum in the form of an unsoluble hydroxide, the pH of the suspension is raised to a value between 8 and 10 (pH 8–10) by adding an alkaline material; e.g. lye, preferably sodium hydroxide solution. The precipitation is followed by the reduction of the precipitated platinum compound using a conventional reducing agent, e.g. with formaldehyde, thereby the pH value of the suspension changes to slightly acidic (pH 4 to 6).

The aluminum alloy component can be immediately applied to this catalytic precursor still present in the slightly acidic suspension. To this end the aluminum is added to the suspension in the form of an aqueous solution of a soluble salt thereof (e.g., aluminum nitrate).

The resulting deposited platinum-aluminum alloy is in finely divided, particulate form.

A dilute ammonia solution is preferably used to precipitate the aluminum. Ammonia is added in such amount to change the pH value to a value between 6 and 8 (pH 6–8). In this manner the aluminum can be completely precipitated in a finely dispersed form onto the platinum-containing catalytic precursor. The use of other bases or the simultaneous deposition of platinum and aluminum is also possible but results in an incomplete precipitation and/or the formation of large alloy particles.

A fixing of the aluminum on the catalytic carrier is obtained by a subsequent calcining heat treatment under an atmosphere of inert gas or a reducing atmosphere. Temperatures in a range of 200°–950° C. are advantageously used for this. At temperatures of at least 500° C. a stoichiometric conversion to platinum aluminum carbide ($Pt_3AlC_{0.5}$) takes place. The calcination time needed for this conversion ranges between 0.5 and 5 hours (0.5–5 hours) depending on the temperature applied. The completion of this conversion can be checked by X-ray diffraction. The X-ray diffraction diagram of the platinum aluminum carbide on the carbon carrier agrees with literature data of the corresponding carrierless compound (Zeitschrift, Metallkunde i.e. Journal of Metal Science 52 (1961) 391). The formation of the face-center cubic carbide phase ($a_0=3.8930$ Å) can be demonstrated by X-ray photography. The lattice constant of pure platinum, on the other hand, is $a_0=3.923$ Å. The $Pt_3Al$ alloy exhibits a tetragonal lattice. Its lattice constants $a_0=3.890$ Å and $C_0=3.830$ Å are so close to one another that the X-ray diffraction diagram exhibits only the structure of a pseudo-cubic lattice with the lattice constant $a_0=3.86$ Å.

Therefore, whereas the $Pt_3Al$ alloy exhibits a lattice contraction of 0.063 Å in comparison to platinum, this lattice contraction is 0.03 Å in the case of the platinum aluminum carbide catalyst of the invention. However, it is not necessary that the platinum-aluminum catalyst of the invention is completely present in the carbidized form. Rather, it is sufficient for anchoring the alloy particles onto the catalytic carrier if the platinum-aluminum alloy is present in predominantly carbidized form. Accordingly, the measurable lattice contraction can be greater than in the case of the completely carbidized form of 0.03 Å. It turned out that lattice contractions in a range between 0.03 and 0.045 Å assure a sufficient carbidization.

Instead of the sequential, in situ precipitation of platinum and aluminum on the carbon carrier described, the invention can also be carried out by first isolating a pure platinum catalyst after the deposition of the platinum. Then the aluminum component is precipitated as already described from a renewed suspension in water. For the isolation of the platinum catalyst the reduced catalytic precursor is filtered off and dried. After the precipitation of the aluminum the catalyst is calcined as described above. It is essential for the catalyst that first platinum aluminum carbide is formed before the other alloy elements are added.

The carbidization of the platinum-aluminum alloy catalyst as described results in a better anchoring of the alloy crystallites on the carbon carrier and consequently in a higher ageing stability of the finished catalyst.

The platinum-aluminum alloy catalyst of the invention can be used in an advantageous manner as a basis for the production of multimetallic alloy catalysts represented by the structural formula:

$$Pt_xAl_yL_z/C$$

in which L designates at least one further alloying element selected from the groups VIB, VIIB, VIII and IB of the Periodic Table of Elements and the atomic ratio of platinum to aluminum satisfies the relationship $$x:y=85:15 \text{ to } 60:40.$$

Surface-bound aluminum can be lost in the preparation of the multimetallic alloy catalyst from the platinum-aluminum catalyst so that e.g. at the limiting ratio Pt:Al of 80:20 in the initial catalyst the platinum-aluminum ratio in the multimetallic alloy catalyst can shift in favor of the platinum to a ratio of 85:15.

The common atomic ratio of platinum and aluminum to the alloy elements L should satisfy the relationship $$(x+y):z=85:15 \text{ to } 50:50.$$

These multimetallic alloy catalysts can be used as electrocatalysts in fuel cells. To this end a platinum content of the catalysts relative to the total weight of 5 to 35% by weight is advantageous.

Of the cited groups of the Periodic Table of the Elements, chromium, molybdenum, tungsten, manganese, iron, cobalt, nickel, rhodium and gold are preferred for the production of multimetallic catalysts.

These alloying elements are applied in a second method step onto the already-finished platinum-aluminum alloy catalyst (i.e., after calcining under an inert gas or reducing atmosphere to form a platinum aluminum alloy on the carrier). To this end the platinum-aluminum alloy catalyst is resuspended in water and mixed with a solution of salts of the desired alloying elements.

The precipitation of the alloy elements in the form of the hydroxides, oxides or their mixed forms is initiated by means of the addition of a base. The complete deposition and fixing of the alloy elements is concluded by a reduction step. For this, customary reducing agents such as e.g. formaldehyde, formates (e.g., sodium formate), boranates (e.g., sodium boronate), hydrazine, and others known in the art can be used. The use of hydrazine has proven to be especially successful since in this manner the reduction step can be carried out already at room temperature.

The multimetallic catalytic precursor is separated following the reduction from the reaction solution, washed and dried in a vacuum. The washing can take place with deionized water, dilute ammonia solution or with other electrolyte additives in order to remove problematic foreign ions such as e.g. chloride ions.

The conversion of the catalytic precursor into an ordered alloy is carried out by a concluding calcining step under inert gas or a reducing atmosphere at temperatures of up to 950° C. The temperature should advantageously be at least 500° C. in order to assure sufficient diffusion rates for the incorporation of the alloy elements into the platinum-aluminum alloy particles. Therefore, the preferred range is 500° to 950° C. The calcination time can be up to 15 h, for examples 1–15 hours, depending on the calcining temperature. Usually, the calcination time is selected so that no appreciable coarsening of the alloy particles occurs in comparison to the platinum-aluminum catalyst. The optimal conditions for the individual, conceivable alloy combinations can be determined by routine experimentation.

The multimetallic platinum alloy rests on the conductive carbon carrier in highly dispersed form with particulate crystallite sizes in a range from 3 to 8 nm, primarily between 4 and 7 nm.

The following examples describe the production of a few catalysts in accordance with the invention. The crystal structure and the electrochemical performance data of these catalysts were determined and compared with the corresponding data of catalysts in accordance with the state of the art.

The amounts of the feed materials (carbon carriers, platinum precursors and aluminum precursors as well as the precursors of the further alloy elements) were measured in accordance with the desired atomic ratios of the alloy components of the particular catalyst. The amount of the platinum precursor was adapted in all examples and reference examples in accordance with a content of the finished catalysts of 10% by weight platinum, taking into consideration the weight amounts of the alloy elements.

The atomic ratios which can be determined by analysis of the finished catalysts can deviate from the atomic ratios by adjusting the amounts of feed material used. The cause for this is on the one hand the precision of analysis given the small weight amounts of the alloy elements and on the other hand the fact that a part of the carbon carrier is consumed as reducing agent for the formation of the alloy. Thus, for example, the amounts of feed materials for the catalyst according to example B5 were designed for an atomic ratio of Pt:Al:Cr=45:26:29. In contrast thereto, the subsequent analysis of the finished catalyst yielded an atomic ratio of Pt:Al:Cr=49:21:30. The amount of aluminum in the finished catalyst was obviously reduced by the detachment or dissolving of surface-bound aluminum during the adding of the further alloy elements by alloying. In the most disadvantageous instance a reduction of the aluminum content of 20% in comparison to the projected value was measured.

The catalysts produced in this manner were characterized as to their X-ray structure and their performance data upon use as cathode catalysts in a phosphoric-acid fuel cell.

Pt/C reference catalyst

A catalyst as described below was produced for comparing the performance data of the catalysts of the invention with the performance data of a monometallic Pt/C catalyst:

45 g graphitized carbon black were suspended in 1.5 liters deionized water and the suspension heated to 90° C. The platinum active component was added to this suspension as a solution of 5 g Pt as platinum(IV)nitrate in one portion. After 15 minutes of agitation at 85° C. the pH of the suspension was adjusted with sodium hydroxide solution to 9 and held for a period of 30 minutes at a temperature of 85° C. For the reduction of the platinum deposited on the black, 6.8 ml formaldehyde (37%) were added to the suspension and the suspension agitated for a further 15 minutes. Thereafter the catalytic precursor obtained in this manner was filtered off, washed with water and dried at 80° C. in a vacuum. The reference catalyst was calcined for a period of one hour at 900° C. for the electrochemical and X-ray characterization.

The finished reference catalyst contained 10% by weight platinum. It is designated with the letter "R" in the following description.

The X-ray diffraction diagram of this catalyst is shown in FIG. 1. It clearly shows the diffraction pattern of the cubic platinum lattice Pt(111) and Pt(200) with a lattice constant $a_0$=3.923 Å as well as the reflex C(002) of the carbon carrier. An average particle size of the platinum crystallites of d=4.6 nm results from the half-intensity width of the diffraction patterns.

EXAMPLE 1.1

For the production of a platinum-aluminum catalyst ($Pt_{75}Al_{25}$) according to the present invention, 5 g platinum was first deposited as described for the production of the reference catalyst onto 44.77 g graphitized carbon black and reduced with formaldehyde. Subsequently, the aluminum alloy component was added in one portion to the suspension as a solution of 0.23 g Al as aluminum nitrate. After 15 minutes of agitation at 85° C. the pH of the suspension was adjusted with dilute ammonia solution to 7.5 and maintained for a period of 15 minutes at a temperature of 85° C. The catalytic precursor was separated off, washed, dried at 80° C. in a vacuum and as a conclusion calcined at 900° C. for 1 hour.

X-ray diffraction analysis showed that an alloy compound $Pt_3AlC_{0.5}$ with an average particle size of 5.6 nm was present. The lattice constant was 3.892 Å.

EXAMPLE 1.2

A further catalyst in accordance with the invention with a somewhat varied alloy composition ($Pt_{63}Al_{37}$) was produced according to example 1.1.

Figure 2:
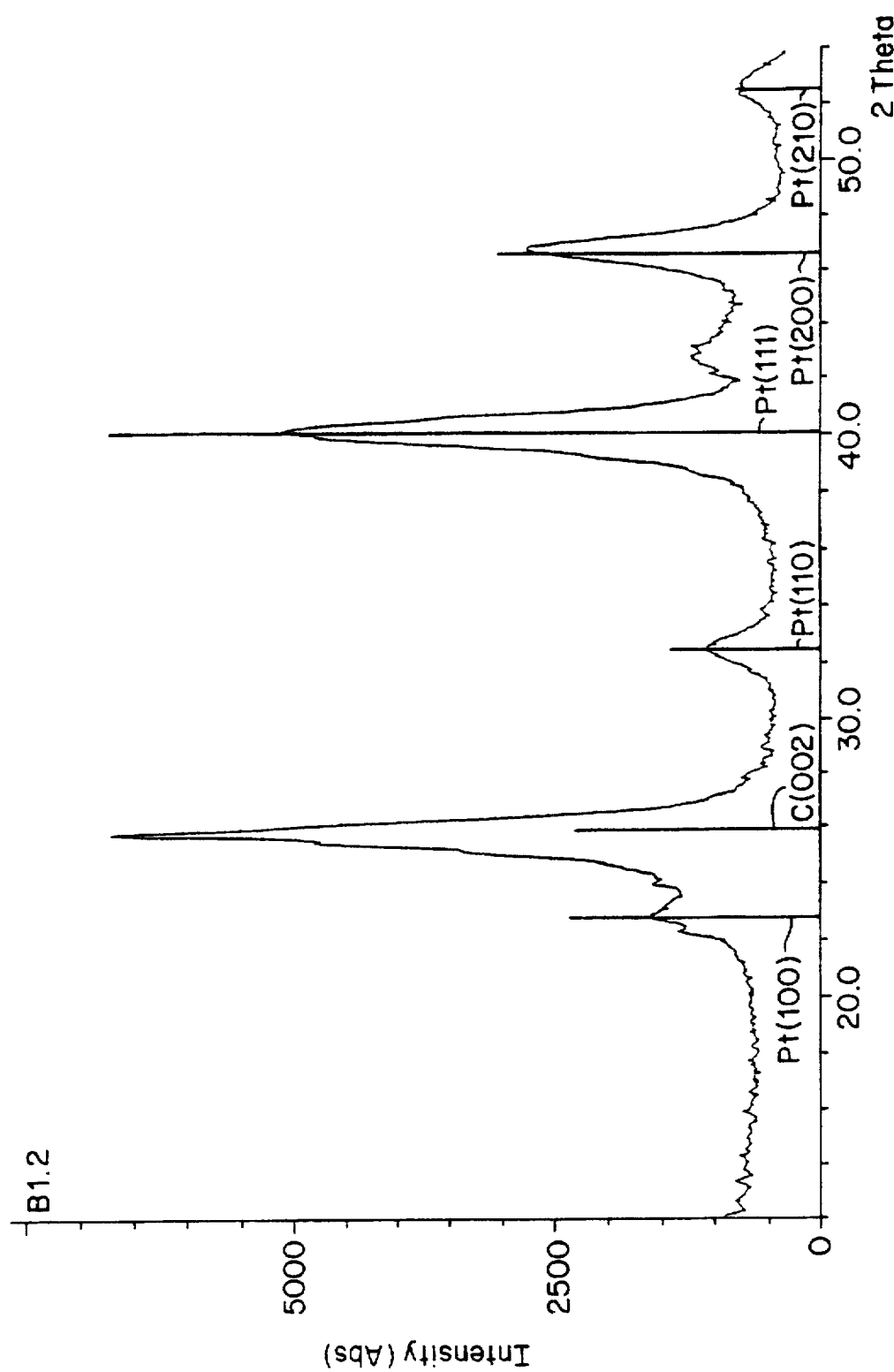
FIG. 2 shows an X-ray diffraction diagram of a platinum-aluminum catalyst in accordance with the invention (example 1.2)

The X-ray diffraction diagram of this catalyst in FIG. 2 also shows the formation of a platinum-aluminum-carbide $Pt_3AlC_{0.5}$ with a lattice constant of $a_0$=3.892 Å and an average particle size of 7.2 nm.

REFERENCE EXAMPLE 1 (VB1)

A reference catalyst $Pt_{63}Al_{37}$ was produced in accordance with examples 1 and 3 in U.S. Pat. No. 4,186,110. 20 g reference catalyst R with 10% by weight platinum were carefully dispersed in 800 ml deionized water with ultrasonic means. Next, a suspension of 0.54 g $Al_2O_3$—C (Degussa) in 200 ml deionized water was added and 0.22 g aluminum nitrate added as flocculation aid. The suspension was heated to 75° C. and maintained at this temperature for 15 minutes in order to obtain the precipitation of the aluminum oxide onto the platinum of the platinum catalyst. The catalytic precursor was then separated off, washed, dried at 80° C. in a vacuum and calcined for 1 hour at 900° C.

Figure 3:
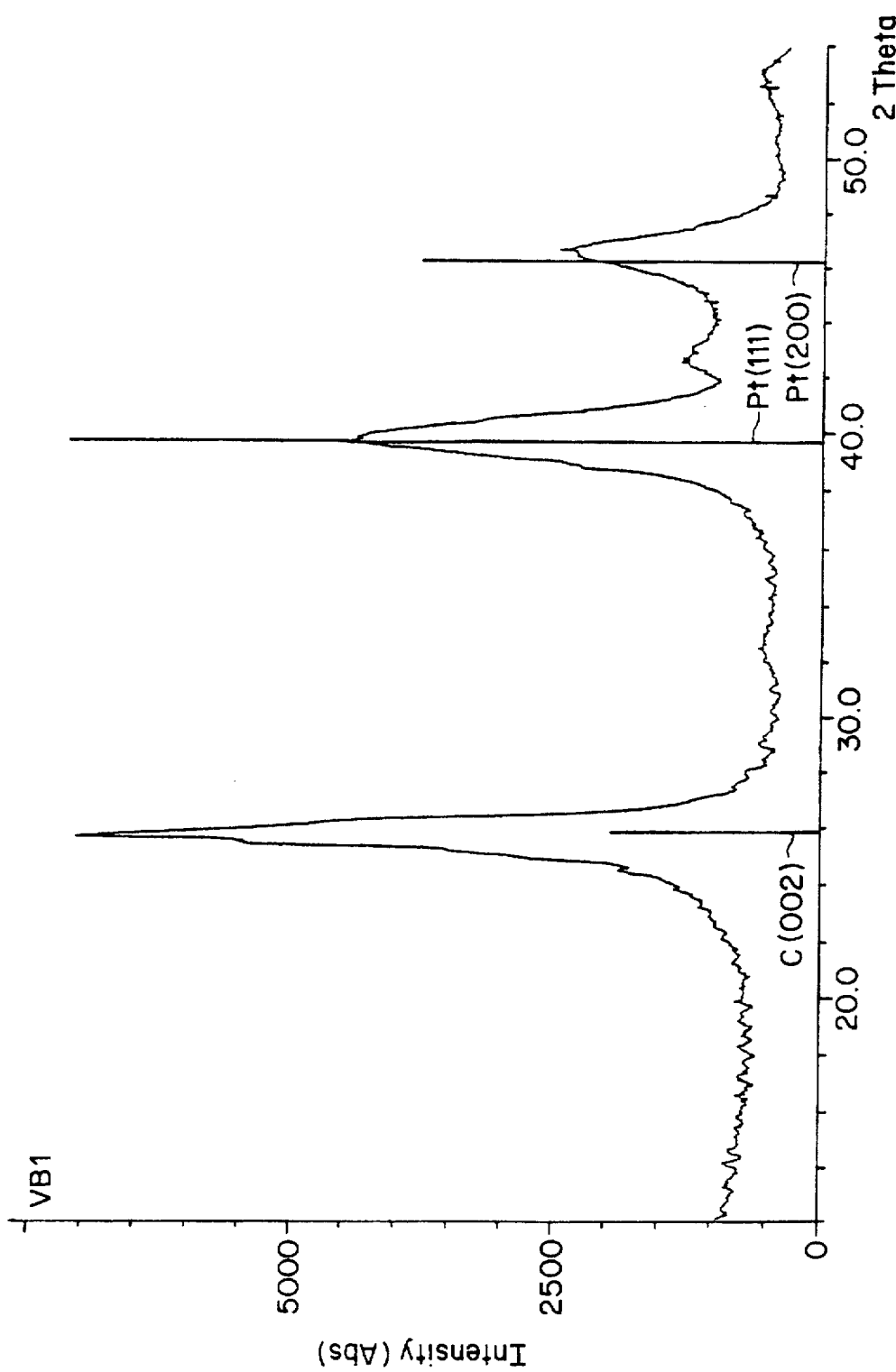
FIG. 3 shows an X-ray diffraction diagram of a platinum-aluminum catalyst according to U.S. Pat. No. 4,186,110 (reference example 1)

The X-ray diffraction diagram of this catalyst is shown in FIG. 3. It shows platinum peaks which are predominantly slightly shifted. The characteristic peaks for $Pt_3AlC_{0.5}$ are lacking. The lattice constant is 3.913 Å.

EXAMPLE 2

A $Pt_3AlC_{0.5}$/C catalyst according to example 1.2 with 9.9% by weight platinum was additionally alloyed with cobalt and iron in order to produce a $Pt_{52}Al_{30}Fe_9Co_9$ catalyst. To this end 30 g of a $Pt_3AlC_{0.5}$ catalyst was again dispersed in 900 ml deionized water and the suspension heated to 75° C. Next, 0.16 g cobalt in the form of cobalt nitrate and 0.15 g iron in the form of iron(III)nitrate dissolved in 60 ml deionized water were poured all at once into the suspension. After 15 minutes of agitation the pH of the suspension was adjusted with NaOH solution to 6.75 and maintained at this value for 15 minutes longer. In order to fix the cobalt and the iron, 3 ml hydrazine hydrate were added and the mixture agitated again for 15 minutes. Finally, the catalyst was filtered off, washed with dilute ammonia solution, dried at 80° C. in a vacuum and calcined at 900° C.

REFERENCE EXAMPLE 2 (VB2)

Reference catalyst R was alloyed with cobalt and iron analogously to example 2. The amounts of the cobalt compounds and iron compounds used were selected in such a manner that the percentages by weight of cobalt and iron in the reference catalyst agreed with the percentages by weight in the catalyst of example 2. This accordingly resulted in a catalyst with the composition $Pt_{74}Co_3Fe_3$.

EXAMPLE 3.1

A catalyst according to example 1.2 with a platinum content of 9.9% by weight was additionally alloyed with cobalt and chromium using cobalt nitrate and chromium nitrate in order to produce a $Pt_{52}Al_{30}Co_7Cr_{11}$ catalyst. The alloying was carried out as described in example 2.

EXAMPLE 3.2

In order to produce a further platinum-aluminum-cobalt-chromium catalyst with a cobalt/chromium ratio diverging from example 3.1 a catalyst according to example 1.2 was additionally alloyed with cobalt and chromium. The amounts of the feed materials were selected in correspondence with the desired composition $Pt_{45}Al_{26}Co_{17}Cr_{12}$.

REFERENCE EXAMPLE 3 (VB3)

A $Pt_{50}Co_{30}Cr_{20}$ catalyst with 10% by weight platinum was produced analogously to example 6 in EP 0,450,849.

EXAMPLE 4

A $Pt_3AlC_{0.5}$/C catalyst with a platinum content of 10.2% by weight according to example 1.1 was alloyed analogously to example 2 with chromium and rhodium in order to produce a $Pt_{51}Al_{17}Cr_{27}Rh_5$ catalyst. To this end the corresponding nitrate compounds of the two alloy elements were used.

REFERENCE EXAMPLE 4 (VB4)

Reference catalyst R was alloyed with chromium and rhodium analogously to example 4 in order to produce a $Pt_{68}Cr27Rh_5$ catalyst. The amounts of the feed materials were selected in such a manner that the aluminum component of the catalyst according to example 4 was replaced by platinum.

EXAMPLE 5

A catalyst according to example 1.2 with a platinum content of 9.9% by weight was additionally alloyed with chromium in order to produce a $Pt_{45}Al_{26}Cr_{29}$ catalyst.

EXAMPLE 6

A platinum-aluminum catalyst according to example 1.1 with a platinum content of 10.2% by weight was additionally alloyed with chromium and manganese using the corresponding appropriate nitrate compounds in order to produce a $Pt_{45}Al_{15}Cr_{30}Mn_{10}$ catalyst.

EXAMPLE 7

A platinum-aluminum catalyst according to example 1.1 with a platinum content of 10.2% by weight was additionally alloyed with chromium and iron using the corresponding nitrate compounds in order to produce a $Pt_{45}Al_{15}Cr_{30}Fe_{10}$ catalyst.

EXAMPLE 8

A platinum-aluminum catalyst according to example 1.1 with a platinum content of 10.2% by weight was additionally alloyed with chromium and nickel using the corresponding nitrate compounds in order to produce a $Pt_{45}Al_{15}Cr_{30}Ni_{10}$ catalyst.

EXAMPLE 9

A platinum-aluminum catalyst according to example 1.1 with a platinum content of 10.3% by weight was additionally alloyed with chromium and molybdenum using potassium molybdate and chromium nitrate in order to produce a $Pt_{45}Al_{15}Cr_{30}Mo_{10}$ catalyst.

EXAMPLE 10

A platinum-aluminum catalyst according to example 1.1 with a platinum content of 10.4% by weight was additionally alloyed with chromium and tungsten using sodium tungstate and chromium nitrate in order to produce a $Pt_{45}Al_{15}Cr_{30}W_{10}$ catalyst.

EXAMPLE 11

A platinum-aluminum catalyst according to example 1.1 with a platinum content of 21.7% by weight was additionally alloyed with chromium and tungsten using sodium tungstate and chromium nitrate in order to produce a $Pt_{45}Al_{15}Cr_{30}W_{10}$ catalyst having 20% by weight platinum.

Based on the examples herein it is expected that gold can also be used in forming the catalyst.

X-ray-photographic characterization of the catalysts

X-ray diffraction diagrams were made of the catalysts and reference catalysts in order to determine the crystal structure, the lattice constant and the average particle sizes. FIGS. 1 to 4 show a few diffraction diagrams by way of example. The following table contains the data determined from the diffraction diagrams.

TABLE 1

Lattice constant $a_0$ and particle size d of the catalysts

| Example | Catalyst on C | $a_0$ [Å] | d [nm] |
|---|---|---|---|
| R | Pt | 3.923 | 4.6 |
| B1.1 | $Pt_{75}Al_{25}$[a] | 3.892 | 5.6 |
| B1.2 | $Pt_{63}Al_{37}$[a] | 3.892 | 7.2 |
| VB1 | $Pt_{63}Al_{37}$[b] | 3.913 | 5.3 |
| B2 | $Pt_{52}Al_{30}Fe_9Co_9$ | 3.852 | 7.0 |
| VB2 | $Pt_{74}Fe_{13}Co_{13}$ | 3.854 | 6.6 |
| B3.1 | $Pt_{52}Al_{30}Co_7Cr_{11}$ | 3.852 | 5.5 |
| B3.2 | $Pt_{45}Al_{26}Co_{17}Cr_{12}$ | 3.820 | 5.5 |
| VB3 | $Pt_{50}Co_{30}Cr_{20}$ | 3.784 | 5.6 |
| B4 | $Pt_{51}Al_{17}Cr_{27}Rh_5$ | 3.845 | 7.2 |
| VB4 | $Pt_{68}Cr_{27}Rh_5$ | 3.859 | 6.3 |
| B5 | $Pt_{45}Al_{26}Cr_{29}$ | 3.854 | 6.9 |
| B6 | $Pt_{45}Al_{15}Cr_{30}Mn_{10}$ | 3.835 | 6.8 |
| B7 | $Pt_{45}Al_{15}Cr_{30}Fe_{10}$ | 3.833 | 6.7 |
| B8 | $Pt_{45}Al_{15}Cr_{30}Ni_{10}$ | 3.837 | 5.9 |
| B9 | $Pt_{45}Al_{15}Cr_{30}Mo_{10}$ | 3.845 | 6.8 |
| B10 | $Pt_{45}Al_{15}Cr_{30}W_{10}$ | 3.845 | 6.5 |

[a]X-ray structure: Platinum-aluminum-carbide $Pt_3AlC_{0.5}$
[b]X-ray structure: No platinum-aluminum-carbide
B = example of the invention
VB = comparative example FIGS. 1 to 4 show the X-ray diffraction diagrams of a few catalysts for diffraction angle (2)×(theta) from 0° to 54°. Vertical lines characterize the position of the diffraction peaks of the particular ideal crystal structure. The diffraction peak of the graphitized black carrier is characterized with C(002). In FIGS. 1 and 3 the peaks of the platinum lattice are marked with Pt (hkl). In FIG. 2 the peaks of $Pt_3AlC_{0.5}$ are indicated with P (hkl).

FIG. 1 is the X-ray diffraction diagram of the monometallic reference catalyst R whereas FIG. 2 shows the X-ray diffraction diagram of the carbidized platinum-aluminum catalyst of example 1.2. A comparison of the two diagrams shows that the lattice of the pure platinum contracts by adding in the aluminum by alloying and formation of the carbidic phase by 0.03 Å (see table 1). The formation of the carbidic phase is clearly documented by the appearance and the position of the diffraction peaks.

In the case of a non-carbidized $Pt_3Al$ alloy the lattice contraction is 0.06 Å. Depending on the strength of the carbidization the lattice contraction of the monometallic catalyst in accordance with the invention is greater than or equal to 0.03 Å. The anchoring of the alloy particles on the carbon carrier by complete or partial carbidization in accordance with the invention is still sufficient if the lattice contraction is a maximum of 0.045 Å.

FIG. 3 shows the X-ray diffraction diagram of the reference catalyst of reference example 1. The diagram shows that the production method indicated in U.S. Pat. No. 4,186,110 does not assure a sufficient alloy formation between platinum and aluminum and also does not make a carbidization possible. The lattice contraction is only 0.01 Å in comparison to pure platinum.

Figure 4:
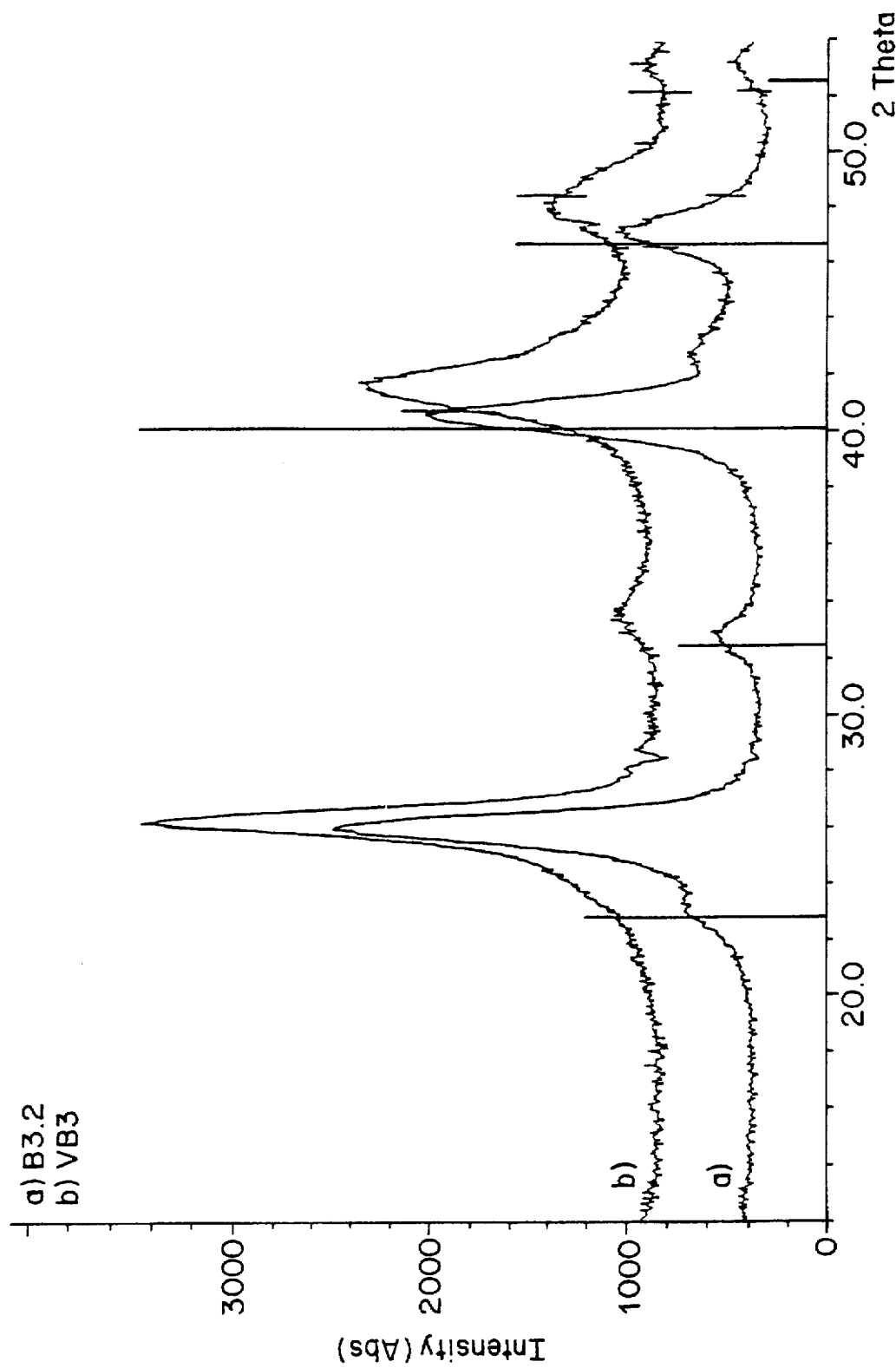
FIG. 4 shows a comparison of the X-ray diffraction diagrams of a platinum-cobalt-chromium catalyst (ref ex. 3) and of a platinum-aluminum-cobalt-chromium catalyst (example 3.2).

FIG. 4 shows the diffraction diagrams of the multimetallic catalysts according to example 3.2 (curve a) and of reference example 3 (curve b). The lattice contraction of the aluminum-free reference catalyst is 0.139 Å but that of the catalyst of the invention is only 0.103 Å on account of the aluminum content and the carbidization.

Electrochemical characterization of the catalysts

In order to determine their electrochemical properties the catalysts of the preceding examples were processed to gas diffusion electrodes with a PTFE content (PTFE:

polytetrafluoroethylene) of 30% by weight. To this end the catalysts were dispersed in a known manner in a suspension of PTFE. A graphite paper rendered water-repellant with PTFE was coated with the resulting suspension and the coating finally sintered at 340° C. The coating was adjusted so that the platinum content of the finished electrode was approximately 0.5 mg Pt/cm$^2$ A piece of the electrodes produced in this manner which was 2 square centimeters in each instance was investigated in an electrochemical half-cell vis-à-vis a dynamic hydrogen electrode (DHE: Dynamic hydrogen electrode) in 103% phosphoric acid at an operating temperature of 190° C. as to its ability to reduce oxygen.

The so-called oxygen mass activity and the potential at a current flow through the fuel cell of 200 mA/mg Pt were measured as characteristic data for this. The oxygen mass activity is defined as the current which develops at a potential of 0.9 V relative to the amount of platinum of the electrode measured in mA/mg Pt. Oxygen served as reactant in the determination of both characteristic data. The indicated potentials are values which were corrected in order to eliminate the internal resistance of the electrochemical cell.

Each of the two characteristic data was measured only after a 3-hour start-up phase. During the start-up phase the electrochemical half-cell was at an operating temperature of 190° C.; however, the electric circuit remained open during this phase so that no current was able to flow. In order to determine the ageing stability the potential was determined at 200 mA/mg Pt after an additional ageing of 19 hours. A measure for the ageing stability results from the difference $\Delta$ of the potential at 200 mA/mg Pt after 3 hours and after 22 hours. The operating conditions during the ageing corresponded to the conditions during the start-up phase. The results of these measurements are listed in the following Table 2 based on 20 wt. % Pt). The values for the fresh state are the measured values after the start-up phase.

TABLE 2

| Examples | Catalyst on C | O$_2$ Mass Activity 0.9 V (mA/mg Pt) | | Potential at 200 mA/mg Pt [m/V] | | |
|---|---|---|---|---|---|---|
| | | 3 h | 22 h | 3 h | 22 h | $\Delta$ |
| R | Pt | 58 | 28 | 852 | 784 | 68 |
| B1.1 | Pt$_{71}$Al$_{29}$[a] | 54 | 35 | 838 | 790 | 48 |
| B1.2 | Pt$_{63}$Al$_{37}$[a] | 75 | 40 | 851 | 793 | 58 |
| VB1 | Pt$_{63}$Al$_{37}$[b] | 40 | 19 | 809 | 744 | 65 |
| B2 | Pt$_{52}$Al$_{30}$Fe$_9$Co$_9$ | 69 | 51 | 855 | 814 | 41 |
| VB2 | Pt$_{74}$Fe$_{13}$Co$_{13}$ | 62 | 27 | 847 | 759 | 88 |
| B3.1 | Pt$_{52}$Al$_{30}$Co$_7$Cr$_{11}$ | 73 | 61 | 861 | 848 | 13 |
| B3.2 | Pt$_{45}$Al$_{26}$Co$_{17}$Cr$_{12}$ | 79 | 62 | 861 | 843 | 18 |
| VB3 | Pt$_{50}$Co$_{30}$Cr$_{20}$ | 71 | 44 | 853 | 828 | 25 |
| B4 | Pt$_{51}$Al$_{17}$Cr$_{27}$Rh$_5$ | 64 | 61 | 846 | 848 | -2 |
| VB4 | Pt$_{68}$Cr$_{27}$Rh$_5$ | 76 | 50 | 854 | 822 | 32 |
| B5 | Pt$_{45}$Al$_{26}$Cr$_{29}$ | 63 | 56 | 848 | 842 | 6 |
| B6 | Pt$_{45}$Al$_{15}$Cr$_{30}$Mn$_{10}$ | 66 | 49 | 852 | 835 | 17 |
| B7 | Pt$_{45}$Al$_{15}$Cr$_{30}$Fe$_{10}$ | 60 | 53 | 854 | 845 | 9 |
| B8 | Pt$_{45}$Al$_{15}$Cr$_{30}$Ni$_{10}$ | 66 | 54 | 851 | 837 | 14 |
| B9 | Pt$_{45}$Al$_{15}$Cr$_{30}$Mo$_{10}$ | 79 | 65 | 856 | 848 | 8 |

TABLE 2-continued

| Examples | Catalyst on C | O$_2$ Mass Activity 0.9 V (mA/mg Pt) | | Potential at 200 mA/mg Pt [m/V] | | |
|---|---|---|---|---|---|---|
| | | 3 h | 22 h | 3 h | 22 h | $\Delta$ |
| B10 | Pt$_{45}$Al$_{15}$Cr$_{30}$W$_{10}$ | 86 | 72 | 862 | 855 | 7 |
| B11[c] | Pt$_{45}$Al$_{15}$Cr$_{30}$W$_{10}$ | 57 | 60 | 846 | 844 | 2 |

[a]X-ray structure: Platinum-aluminum-carbide Pt$_3$AlC$_{0.5}$
[b]X-ray structure: No Platinum-aluminum-carbide
[c]based on 20 wt. % Pt The aluminum-containing platinum alloy catalysts are distinguished in comparison to the corresponding aluminum-free catalysts by an elevated ageing stability. Compared to reference catalyst VB3, which represents the more recent state of the art, certain platinum-aluminum alloy combinations exhibit an elevated initial activity. As a result of this elevated initial activity in conjunction with the good ageing behavior such electrode catalysts can be used with advantage in phosphoric-acid fuel cells. Likewise, experience has shown that these catalysts can also be successfully used in polymer electrolyte fuel cells.

Further variations and modifications of the foregoing will be approved to those skilled in the art and are intended to be encompassed by the claims appended hereto.

German priority application 195 17 598.0, filed on 13 May 1995, is relied on and incorporated by reference in its entirety.

We claim:

1. A catalyst comprising a platinum-aluminum alloy deposited on a conductive carbon carrier wherein said platinum-aluminum alloy is further alloyed with chromium and the alloy is in particulate form.

2. The catalyst according to claim 1 wherein the atomic ratio of platinum to aluminum is from 85:15 to 60:40 and the atomic ratio of platinum and aluminum to chromium is from 85:15 to 50:50.

3. The catalyst according to claim 2 wherein said platinum alloy comprising chromium is alloyed with one further alloy element selected from the group consisting of molybdenum, tungsten, manganese, iron, cobalt, nickel, and rhodium and wherein the atomic ratio of platinum and aluminum to chromium and the further alloy element is from 85:15 to 50:50.

4. The catalyst according to claim 1 wherein the content of said platinum is 5 to 35% by weight in relation to the total weight of said catalyst.

5. The catalyst according to claim 1 wherein the size of the alloy particles on the conductive carbon carrier is between 3 and 8 nm.

6. The catalyst according to claim 1 wherein the size of the alloy particles on the conductive carbon carrier is between 4 and 7 nm.

* * * * *